United States Patent [19]

Nowitzki et al.

[11] Patent Number: 5,032,452

[45] Date of Patent: Jul. 16, 1991

[54] IDENTIFICATION OF ABSORBENT MATERIAL WITH A THERMOSTABLE COLORANT AND PROCESS

[75] Inventors: Bernd Nowitzki; Annette Sandkuhler, both of Marl; Werner Duismann, Dorsten; Karin Müller, Marl; Peter Rennwanz, Haltern, all of Fed. Rep. of Germany

[73] Assignee: Huels Aktiengesellschaft, Marl, Fed. Rep. of Germany

[21] Appl. No.: 481,407

[22] Filed: Feb. 20, 1990

[30] Foreign Application Priority Data

Mar. 23, 1989 [DE] Fed. Rep. of Germany ....... 3909628

[51] Int. Cl.$^5$ ............................................... B32B 5/14

[52] U.S. Cl. ................................. 428/307.7; 427/287; 427/372.2; 428/470; 428/699

[58] Field of Search .............................. 427/287, 372.2; 428/307.7, 470, 699

Primary Examiner—Bernard Pianalto
Attorney, Agent, or Firm—Millen, White & Zelano

[57] ABSTRACT

A process is provided for applying a thermostable identification mark to an absorbent material such as piece goods or ceramics. A cobalt salt solution containing hydrogen peroxide is applied in the form of a mark to the surface of an absorbent material, followed by a thermal aftertreatment above 400° C. for stabilization of the identifying mark.

12 Claims, No Drawings

IDENTIFICATION OF ABSORBENT MATERIAL WITH A THERMOSTABLE COLORANT AND PROCESS

This invention relates in general to a process for the application of a thermostable identification mark to absorbent material and, more particularly, to a process of applying a thermostable colorant composition comprising a cobalt salt solution to an absorbent material and stabilizing the resulting mark by a thermal aftertreatment, as well as to the compositions employed and the resultant intermediate and final products.

BACKGROUND OF THE INVENTION

The identification of materials having an absorbent substrate is of general importance in industrial manufacture. The state of the art includes many procedures for identifying piece goods during the manufacturing process. Such identification offers to the manufacturer, inter alia, the advantage of improved production control as compared with an imprint applied only to the finally manufactured product. Also, the user of the product has advantages due to a permanent identification, for example, when associating individual items with suppliers, and determination of delivery times.

Inkjet printers are frequently employed in the art for the labeling of relatively large areas having an absorbent substrate, for example, paper, wood, ceramics. For this purpose, and for technically similar systems, a large array of suitable colorants is available from various manufacturers. Many of these colorants contain soluble organic dyes which lack thermostability. Suspensions of colored pigments cannot be utilized in this identification technique because they are incompatible with the devices used in applying the marks.

It is known in accordance with Japanese Laid-Open Application Sho 60/49073 and Japanese Published Application 75/6802 to utilize solutions of cobaltous thiocyanate as blue inks which can be removed with water. Japanese Laid-Open Application Sho 63/30572 discloses the use of copper-or cobalt-chelate complexes as inks. However, these inks exhibit low compatibility with the identified material when subjected to a thermal aftertreatment.

German Patent Application P 39 02 225, which is not a prior publication, describes a method for the identification of absorbent material with a thermostable colorant characterized by applying a cobalt salt solution to an absorbent material and then stabilizing the thus-applied identification mark by a thermal aftertreatment at temperatures higher than 400° C. However, the cobalt salt solution applied according to the German Patent Application P 39 02 225 is not very legible immediately after application to the absorbent material. This holds true, in particular, for identification marks applied to absorbent material which are other than white.

It is therefore desired to have for the identification of absorbent material a thermostable colorant and process of using same, wherein the colorant is very readily readable immediately after application as well as after a thermal treatment at temperatures higher than 400° C. Such identification marks can be used to control manufacturing of the end product or intermediate products which are subjected to elevated temperatures.

Upon further study of the specification and appended claims, further objects and advantages of this invention will become apparent to those skilled in the art.

SUMMARY OF THE INVENTION

The present invention provides a thermostable colorant composition and process of applying same for the identification of absorbent material wherein a composition comprising a cobalt salt solution containing hydrogen peroxide and optionally a copper salt and an optional thickening agent is applied to the surface of an absorbent material. The thus-applied identification mark can then be stabilized by a thermal aftertreatment at temperatures higher than 400° C.

It has been surprisingly found that, by the application to an absorbent material of a composition comprising a cobalt salt solution containing hydrogen peroxide, it is possible to obtain an identification mark which is easily readable immediately after application to the substrate. The resulting mark was also found to have a profoundly dark color with excellent vividness of color which turns color to the well-known "cobalt black" when heated to temperatures higher than about 400° C.

The cobalt salt solution contains from about 0.01 to 20% by weight of hydrogen peroxide, based on the cobalt salt solution provided. The molar ratio of hydrogen peroxide to cobalt is preferably 0.05:1 to 0.8:1.

The hydrogen peroxide is preferably added to the cobalt salt solution as an aqueous hydrogen peroxide solution which preferably has a concentration of hydrogen peroxide of about 25–30% by weight.

When an aqueous cobalt solution is used, the cobalt salt preferably comprises from about 5 to 29 % by weight of the solution.

Cobaltous acetate is a preferred cobalt salt for use in the present invention.

Depending upon the coloration of the substrate, it may be advantageous to include in the cobalt salt solution a copper salt.

The preferred copper salt is copper acetate.

In a preferred embodiment, the copper salt is present in a molar ratio to the cobalt salt of about 0.02–0.2:1. The addition of a copper salt to the cobalt salt solution was found to increase the stability of the colorant to the effects of an acid environment.

Depending on the characteristics of the substrate, it may be desired to adjust in a controlled manner the pH value of the cobalt salt solution utilized in accordance with the present invention. This can be accomplished by adding to the cobalt salt solution a salt such as, for example, ammonium carbonate or ammonium acetate. In a preferred embodiment, the pH is adjusted to between 4.5 and 7.0, preferably from 5.0 to 6.0.

Various solvents are suitable for preparing the cobalt salt solution utilized according to the present invention. Preferred solvents are water, acetic acid, methanol and ethanol. Most preferred is water.

Depending on the absorbency of the substrate being marked, it may be useful to increase the viscosity of the colorant solution by incorporating a suitable thickening agent therein. Thus, the cobalt salt solution used according to the present invention can additionally contain an agent for increasing the viscosity of the cobalt salt solution. Suitable thickening agents include but are not limited to: methylcellulose, methylhydroxyethylcellulose, carboxymethylcellulose.

A preferred thickening agent is methyl cellulose which can comprise from about 0.1 to 2 % by weight of the solution.

The cobalt salt solution utilized in accordance with the present invention can be applied to the absorbent material with the aid of any desired apparatus suitable for this purpose, such as, for example, a roller marker, or a screen printing machine. A preferred apparatus for applying the cobalt salt solution is an inkjet printer.

Although any substrate can be marked with the colorant composition of the present invention, preferred absorbent materials which can be marked according to the present invention are, for example, sintered metals, stone materials, clay products, and ceramics.

The process and composition of the present invention is especially suitable for applying a thermostable colorant to a ceramic item to mark same for identification. Preferably, the method of the present invention can be utilized for the identification of piece goods of absorbent materials by means of a thermostable colorant. The thermal aftertreatment of the identifying mark applied in accordance with the present invention can be effected, for example, by baking or calcining above a temperature of about 400° C. During this heat treatment, the cobalt salts and copper salts used in accordance with the present invention are converted into their corresponding oxides.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire texts of all applications, patents and publications, if any, cited above and below, and of corresponding application Federal Republic of Germany P 39 09 628.9, filed Mar. 23, 1989, are hereby incorporated by reference.

EXAMPLE 26.5 g of cobalt(II) acetate is dissolved in 63.1 ml of water and, under agitation, 2.4 g of a 30% by weight hydrogen peroxide solution is added thereto. This solution is employed in a commercially available inkjet printer, for example, type LCP 1 000 (WILLETT GmbH, West Germany).

The identification mark is applied to honeycomb-shaped items consisting predominantly of titanium dioxide which are utilized as catalysts for the removal of nitrogen oxides from flue gases during the course of a manufacturing process, namely after a drying step and prior to a baking stage.

A highly legible, very dark label is immediately obtained.

The identification mark remains intact during the subsequent process steps of manufacturing, including baking at temperatures above 450° C.

Since the colorant has been absorbed by the matrix, the identification mark remains in existence during the service life of the item under eroding conditions, i.e., even with abrasion on the surface.

The preceding example can be repeated with similar success by substituting the generically or specifically described reactants and/or operating conditions of this invention for those used in the preceding example.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for applying a thermostable identification mark to an absorbent material wherein a thermostable colorant of a cobalt salt solution is applied to the absorbent material and the thus-applied identification mark is stabilized by a thermal aftertreatment at temperatures higher than 400° C., the improvement comprising adding a sufficient amount of hydrogen peroxide to the cobalt salt solution to provide a darker mark before and after treatment than would be the case without the addition of hydrogen peroxide.

2. The process according to claim 1, wherein the cobalt salt solution contains 0.01–20% by weight of hydrogen peroxide, based on the provided cobalt salt solution.

3. The process according to claim 1, wherein the cobalt salt solution contains a copper salt.

4. The process according to claim 3, wherein the copper salt is copper acetate.

5. The process according to claim 1, wherein the cobalt salt is cobaltous acetate.

6. The process according to claim 1, wherein the cobalt salt solution is applied to the absorbent material by an inkjet printer.

7. The process according to claim 1, wherein the absorbent material is a ceramic material.

8. The process according to claim 1, wherein the cobalt salt solution is applied to piece goods of absorbent material.

9. An absorbent material having an identifying mark thereon applied by the process of claim 1.

10. The absorbent material of claim 9, wherein the material is a sintered metal, stone material, clay product, or ceramic.

11. A process for applying a thermostable identification mark to a substrate comprising applying to said substrate a solution of a cobalt salt and a sufficient amount of hydrogen peroxide to provide a darker mark compared to a solution of a cobalt salt without hydrogen peroxide.

12. An absorbent material having an identifying mark thereon applied by the process of claim 11.

* * * * *